(12) United States Patent
Yasuda

(10) Patent No.: US 7,388,614 B2
(45) Date of Patent: Jun. 17, 2008

(54) AUTOMATIC FOCUS ADJUSTMENT DEVICE AND METHOD USING AUXILIARY LIGHT

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1060 days.

(21) Appl. No.: 10/713,206

(22) Filed: Nov. 17, 2003

(65) Prior Publication Data
US 2004/0095504 A1    May 20, 2004

Related U.S. Application Data

(63) Continuation of application No. 09/127,553, filed on Aug. 3, 1998, now abandoned.

(30) Foreign Application Priority Data

| Aug. 18, 1997 | (JP) | ................................. 9-221341 |
| Aug. 19, 1997 | (JP) | ................................. 9-222389 |
| Aug. 20, 1997 | (JP) | ................................. 9-223443 |

(51) Int. Cl.
*H04N 5/232* (2006.01)

(52) U.S. Cl. ...................................................... 348/349
(58) Field of Classification Search ................ 348/349, 348/353, 354
See application file for complete search history.

(56) References Cited

U.S. PATENT DOCUMENTS

| 5,164,833 A | 11/1992 | Aoki ........................... 358/224 |
| 5,448,331 A | 9/1995 | Hamada et al. .............. 354/403 |
| 5,946,035 A | 8/1999 | Suh .............................. 348/371 |
| 6,028,981 A | 2/2000 | Hirasawa et al. ........... 386/117 |
| 6,236,431 B1 | 5/2001 | Hirasawa et al. ........... 348/240 |
| 6,333,761 B2 | 12/2001 | Yasuda ................... 348/333.12 |

*Primary Examiner*—Lin Ye
*Assistant Examiner*—Dillon Durnford-Geszvain
(74) *Attorney, Agent, or Firm*—Fitzpatrick, Cella, Harper & Scinto

(57) ABSTRACT

A microcomputer (118) which controls a video camera (100) inhibits driving of a focus lens (105) which has already moved to an in-focus position in focus adjustment of the focus lens (105) with respect to an object while an auxiliary light-emitting unit (121) is ON, and after that, turns off the auxiliary light-emitting unit (121).

9 Claims, 13 Drawing Sheets

FIG. 6

| ILLUMINANCE (Lux) | CORRECTION AMOUNT (mm) |
|---|---|
| 0 | 0.174 |
| 10 | 0.108 |
| 20 | 0.048 |

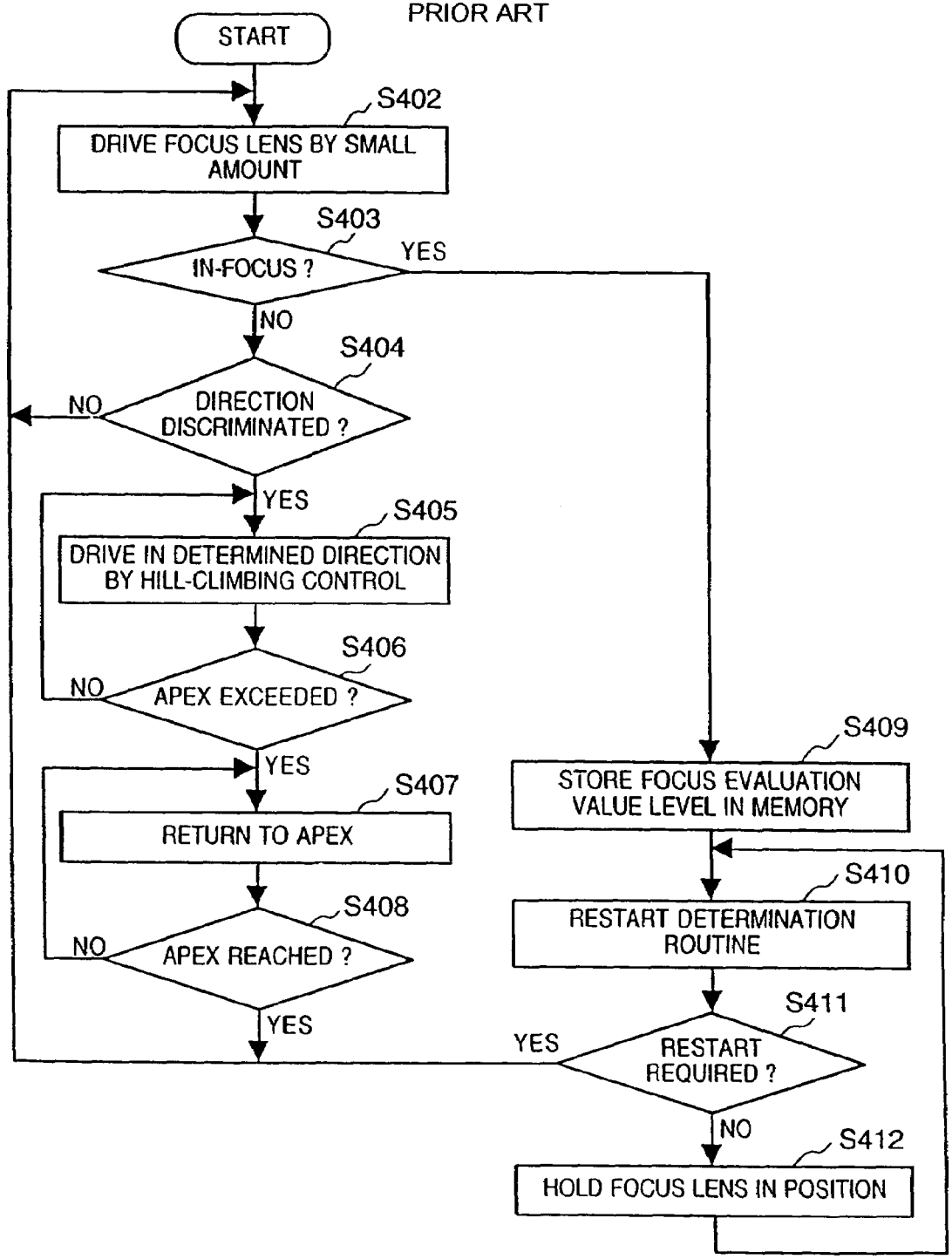

AUTOMATIC FOCUS ADJUSTMENT DEVICE AND METHOD USING AUXILIARY LIGHT

This is a continuation of Application Ser. No. 09/127,553 filed Aug. 3, 1998.

BACKGROUND OF THE INVENTION

The present invention relates to an automatic focus adjustment device for automatically adjusting a focus lens to an in-focus position with respect to an object, an image sensing apparatus with the automatic focus adjustment device, and a focus adjustment method.

In the field of video cameras as typical image sensing apparatuses, a technique for recording still images is receiving a lot of attention in addition to recording of moving images. In order to record a high-quality still image, a video camera to which a so-called electronic flash device (light projector) can be attached has been proposed.

Some of such electronic flash devices comprise an auxiliary light-emitting unit or function used when an autofocus (AF: automatic focus adjustment) function operates before image sensing, in addition to a main light-emitting unit. In a video camera which uses an electronic flash device having such auxiliary light-emitting unit, the auxiliary light-emitting unit is turned on before still image recording, a focus lens is moved to an in-focus position by the AF function, and the main light-emitting unit is turned on. Then, a still image is recorded.

Since the principal objective of the AF function of a video camera or the like is normally to sense moving images, the following TVAF (Television-AF) scheme is popularly used. That is, the sharpness of the picture sensed by an image sensing element such as a CCD (charge coupled device) is detected using a video signal obtained by photoelectrically converting an object image obtained via an optical system by the image sensing element, and the position of the focus lens is controlled to maximize the sharpness, thus attaining real-time focus adjustment.

Upon evaluating the sharpness, it is a common practice to use the level of a high-frequency component (to be referred to as a focus evaluation value hereinafter) of a video signal extracted by a bandpass filter for an arbitrary frequency band. For example, when an image of an object such as a person or the like is sensed, a focus evaluation value Y becomes larger as the position of the focus lens approaches an in-focus position, and a point P where that level becomes maximum is detected as the in-focus position of the focus lens, as shown in FIG. 12.

A general AF function executed in the above-mentioned video camera will be described in detail below with reference to the flow chart shown in FIG. 13.

The focus evaluation value is calculated while moving the focus lens by a predetermined small amount (step S402). It is then checked based on the moving direction of the focus lens and changes in level of the calculated focus evaluation value if the focus lens is currently at an in-focus position or out-of-focus position (step S403).

If it is determined in step S403 that the focus lens is currently at the in-focus position, the driving of the focus lens is stopped, and the control advances to restart monitoring processing in step S409 and the subsequent steps.

That is, the focus evaluation value corresponding to the current in-focus position is stored in a memory (focus evaluation value level memory) (step S409), and restart discrimination is executed (step S410).

In the restart discrimination, it is checked if the current focus evaluation value has drifted from that stored in the memory in step S409 upon focus adjustment. For example, if the current focus evaluation value has changed by a predetermined level or more from that stored in the memory, it is determined that the object has changed due to movement of the object, panning, and the like, and restart is required. On the other hand, if the current focus evaluation value has undergone a change less than the predetermined level, it is determined that the object has not moved, and restart is not required.

It is then checked based on the result of such restart discrimination (step S410) if restart is required (step S411). If it is determined that restart is required, the flow returns to step S402 to execute micro driving, in-focus discrimination, and direction discrimination of the focus lens in turn. On the other hand, if it is determined that restart is not required, the current position of the focus lens is maintained, and the flow returns to step S410 to execute the restart monitoring processing again.

If it is determined in step S403 that the focus lens is currently not at the in-focus position, the direction of the in-focus position of the focus lens is discriminated on the basis of the direction of micro driving of the lens done in step S402, and changes in level of the focus evaluation value at that time (step S404). If the direction can be discriminated, hill climbing, i.e., driving of the focus lens to an in-focus position in steps S405 and S406 (to be described later) is executed. If the direction cannot be discriminated, the flow returns to step S402 to repeat the subsequent processing steps.

Note that "hill climbing" is named since the focus lens is moved to be, as an in-focus point, a peak position of a "hill-like" characteristic curve of the focus evaluation value.

If the direction can be discriminated in step S404, the focus lens is driven by hill climbing in that discriminated direction (step S405), and it is checked if the focus lens position has overshot the in-focus point, i.e., an apex (P in FIG. 12) of the evaluation value (step S406).

If it is determined in step S406 that the focus lens position has not overshot the apex of the evaluation value yet, the flow returns to step S405 to continue hill climbing. Otherwise, operation for returning the focus lens position to the apex is done (step S407). It is then checked if the focus lens position has reached the apex (step S408). After that, step S407 repeats itself until the focus lens position reaches the apex.

During operation for returning the focus lens position to the apex in steps S407 and S408, the object may change due to, e.g., panning or the like of the video camera. For this reason, if the focus lens position has reached the apex ("YES" in step S408), the flow returns to step S402 to execute micro driving again, so as to check if the current position is on a correct apex, i.e., the in-focus point.

By repeating steps S401 to S412 mentioned above, the focus lens can be driven to always maintain an in-focus state.

However, with the above-mentioned AF function, if the detected focus evaluation value has changed, the focus lens moves upon driving and is offset from the in-focus position.

That is, after the electronic flash device (light-emitting unit) is turned on and the focus lens position is adjusted to the in-focus position by the AF function, if the electronic flash device is turned off while the AF function is in operation, the focus evaluation value changes due to changes in illuminance of the object. For this reason, the focus lens moves from the current position by focus adjustment of the AF function. As a result, an out-of-focus state is formed upon recording a still image, and a low-quality still image is recorded by the video camera.

SUMMARY OF THE INVENTION

The present invention has been made in consideration of the above situation, and has as its object to provide an automatic focus adjustment device which can inhibit focus adjustment resulting from changes in ON state of a light projector, and can attain optimal automatic focus adjustment, a focus adjustment method, and an image sensing apparatus.

In order to achieve the above object, an automatic focus adjustment device according to the present invention is characterized by comprising the following arrangement.

That is, there is provided an automatic focus adjustment device comprising:

a light projector for illuminating an object;

an optical system for receiving an image of the object illuminated by the light projector; and focus adjustment control means for adjusting a position of the optical system to an in-focus position by moving the optical system in an optical axis direction on the basis of an input video signal, wherein the focus adjustment control means controls an ON/OFF state of the light projector in accordance with a focus adjustment state with respect to the object.

Preferably, upon completion of focus adjustment for the object while the light projector is ON, the focus adjustment control means inhibits the optical system from being driven before the light projector is turned off.

At this time, upon completion of focus adjustment for the object while the light projector is ON, the focus adjustment control means preferably inhibits the optical system from being driven before the light projector is turned off.

Also, preferably, the light projector includes first and second light projection units, and the focus adjustment control means holds the optical system at the in-focus position with respect to the object even when the second light projection unit is turned on, by moving the optical system by an offset amount of an in-focus position of the optical system arising from different characteristics of light beams emitted by the first and second light projection units, when the position of the optical system is adjusted to the in-focus position with respect to the object by turning on the first light projection unit.

Furthermore, preferably, the light projector includes first and second light projection units, the device further comprises storage means for pre-storing information related to an offset amount of an in-focus position of the optical system arising from different characteristics of light beams emitted by the first and second light projection units, and the focus adjustment control means holds the optical system at the in-focus position with respect to the object even when the second light projection unit is turned on, by acquiring, from the storage means, an offset amount of an in-focus position corresponding to brightness of the object obtained upon turning on the first light projection unit when the position of the optical system is adjusted to the in-focus position with respect to the object by turning on the first light projection unit, and moving the optical system by the acquired offset amount.

Moreover, preferably, the light projector includes first and second light projection units, and the optical system includes a focus lens and zoom lens, the device further comprises storage means for pre-storing information related to an offset amount of an in-focus position of the focus lens upon movement of the zoom lens, and the focus adjustment control means holds the optical system at the in-focus position with respect to the object by acquiring, from the storage means, an offset amount of an in-focus position corresponding to the current position of the zoom lens when the position of the optical system is adjusted to the in-focus position with respect to the object by turning on the first light projection unit, and moving the focus lens by the acquired offset amount.

Note that a moving image or still image of an object is recorded on a recording medium preferably using an image sensing apparatus with the above-mentioned automatic focus adjustment device.

Preferably, an image sensing apparatus comprises:

a light projector for illuminating an object;

an optical system for receiving an image of the object illuminated by the light projector;

image sensing means for sensing an object image obtained via the optical system, and outputting the input video signal;

focus adjustment control means for adjusting a position of the optical system to an in-focus position by moving the optical system in an optical axis direction on the basis of the video signal output from the image sensing means; and recording means for recording a moving or still image of an object on a recording medium in correspondence with the input video signal, wherein the focus adjustment control means turns on/off the light projector in synchronism with a vertical sync signal of the video signal and sets an ON period of the light projector at an integer multiple of a vertical sync period of the video signal upon executing focus adjustment with respect to the object.

In order to achieve the above object, a focus adjustment method according to the present invention is characterized by comprising the following arrangement.

That is, there is provided a focus adjustment method having the focus adjustment step of adjusting a position of an optical system to an in-focus position by moving the optical system, which receives an image of an object illuminated by a light projector, in an optical axis direction of the optical system on the basis of an input video signal, comprising the step of:

controlling an ON/OFF state of the light projector in accordance with a focus adjustment state with respect to the object.

Preferably, upon completion of focus adjustment for the object while the light projector is ON, the focus adjustment control step includes the step of inhibiting the optical system from being driven before the light projector is turned off.

At this time, preferably, the position of the optical system is adjusted to the in-focus position by moving the optical system in the optical axis direction to maximize a focus evaluation value obtained by extracting a high-frequency component in the input video signal.

Also, preferably, the light projector includes first and second light projection units, and the focus adjustment control step includes the step of holding the optical system at the in-focus position with respect to the object even when the second light projection unit is turned on, by moving the optical system by an offset amount of an in-focus position of the optical system arising from different characteristics of light beams emitted by the first and second light projection units, when the position of the optical system is adjusted to the in-focus position with respect to the object by turning on the first light projection unit.

Furthermore, preferably, the light projector includes first and second light projection units, information related to an offset amount of an in-focus position of the optical system arising from different characteristics of light beams emitted by the first and second light projection units is pre-stored in a memory, and the focus adjustment control step includes the steps of:

holding the optical system at the in-focus position with respect to the object even when the second light projection unit is turned on, by acquiring, from the memory, an offset amount of an in-focus position corresponding to brightness of the object obtained upon turning on the first light projection unit when the position of the optical system is adjusted to the in-focus position with respect to the object by turning on the first light projection unit, and moving the optical system by the acquired offset amount.

Moreover, preferably, the light projector includes first and second light projection units, and the optical system includes a focus lens and zoom lens, information related to an offset amount of an in-focus position of the focus lens upon movement of the zoom lens is pre-stored in a memory, and the focus adjustment control step includes the step of holding the optical system at the in-focus position with respect to the object by acquiring, from the memory, an offset amount of an in-focus position corresponding to the current position of the focus lens when the position of the optical system is adjusted to the in-focus position with respect to the object by turning on the first light projection unit, and moving the focus lens by the acquired offset amount.

In addition, there is provided a focus adjustment method for an image sensing apparatus which illuminates an object by a light projector, senses an image of the illuminated object input via an optical system using an image sensing element, and records a moving or still image of the object on a recording medium in correspondence with a video signal output from the image sensing element, wherein the focus adjustment step of adjusting a position of the optical system to an in-focus position with respect to the object includes the step of turning on/off the light projector in synchronism with a vertical sync signal of the video signal when the optical system is moved in an optical axis direction to maximize a focus evaluation value obtained by extracting a high-frequency component from the video signal output from the image sensing element, and setting an ON period of the optical system at an integer multiple of a vertical sync period of the video signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a table showing the correction amount of the focus lens position corresponding to the illuminance of an object in the AF control according to the third embodiment of the present invention;

FIG. 13 is a flow chart showing AF control in a general video camera.

DESCRIPTION OF THE PREFERRED EMBODIMENTS

The preferred embodiments of the present invention will now be described in detail with reference to the accompanying drawings.

First Embodiment

In the following description of this embodiment, an automatic focus adjustment device according to the present invention is applied to a video camera 100 shown in FIG. 1 as a typical image sensing apparatus.

Figure 1:
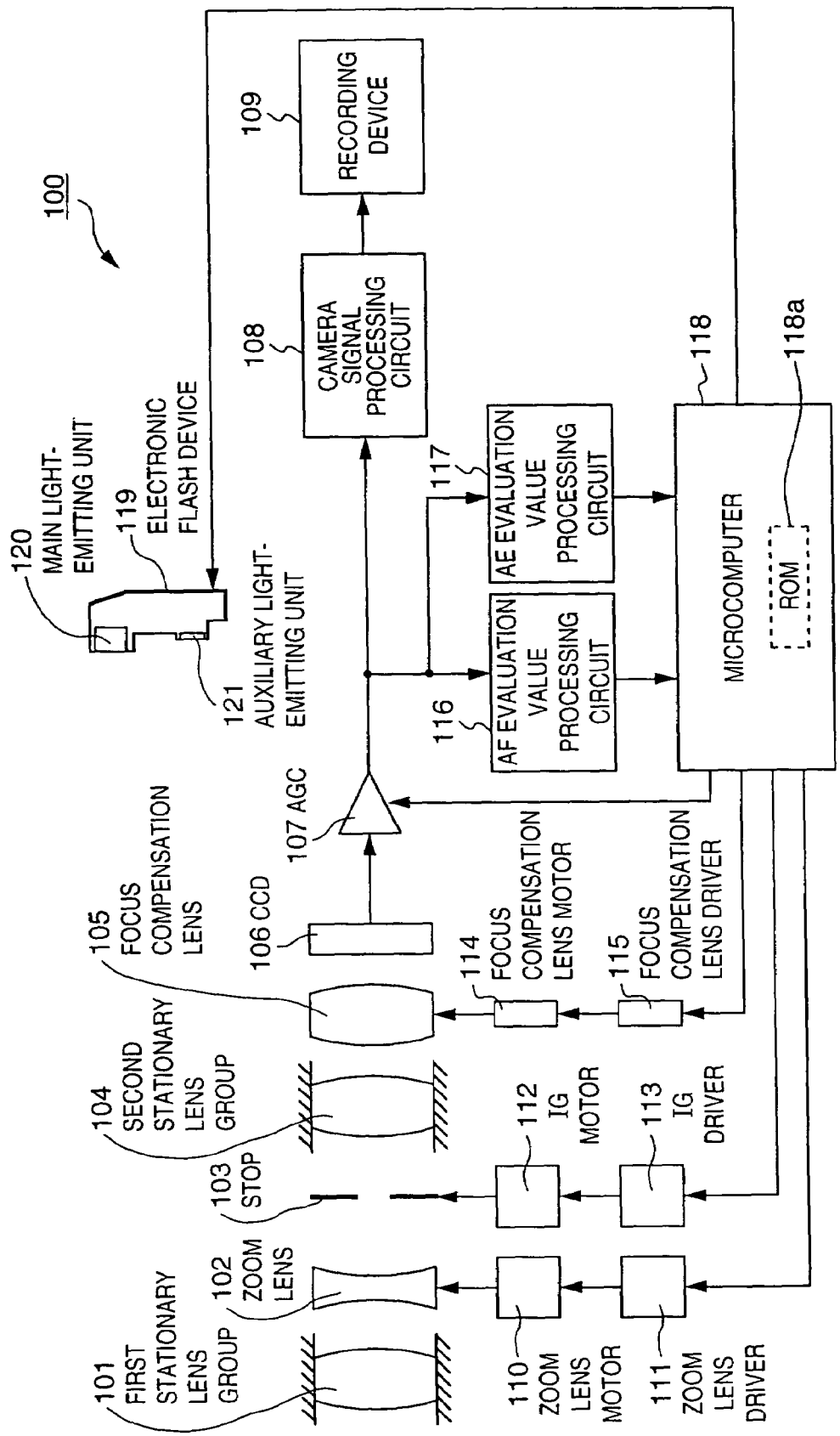
FIG. 1 is a block diagram showing the arrangement of a video camera according to the first embodiment of the present invention.

FIG. 1 is a block diagram showing the arrangement of the video camera as the image sensing apparatus according to the first embodiment of the present invention.

The video camera 100 shown in FIG. 1 has an optical system comprised of a stationary first lens group 101, zoom lens 102, stop 103, stationary second lens group 104, and focus compensation lens (to be referred to as a focus lens hereinafter) 105 which are disposed in turn from the side of an object (not shown).

In the video camera 100, reference numeral 106 denotes an image sensing element which receives light coming from the focus lens 105. Reference numeral 107 denotes an amplifier (AGC) for receiving the output from the image sensing element 106. Reference numeral 108 denotes a camera signal processing circuit for receiving the output from the AGC 107. Reference numeral 116 denotes a focus evaluation value (AF evaluation value) processing circuit for obtaining a focus evaluation value representing the focus state by extracting a high-frequency component from a video signal output from the AGC 107 using a bandpass filter. Reference numeral 117 denotes an exposure evaluation value (AE evaluation value) processing circuit for obtaining an exposure evaluation value by extracting the average level of luminance values in the video signal, and comparing the extracted level with a predetermined level. Reference numeral 109 denotes a recording device such as a VTR or the like for receiving the output from the camera signal processing circuit 108. Reference numeral 118 denotes a microcomputer for receiving the output signals from the AF and AE evaluation value processing circuits 116 and 117, and controlling the AF function of the video camera 100. Reference numeral 111 denotes a zoom lens driver for driving the zoom lens 110. Reference numeral 113 denotes an IG driver for driving an IG motor 112. Reference numeral 115 denotes a focus compensation lens (focus lens) driver for driving a focus compensation lens (focus lens) motor 114. Reference numeral 119 denotes an electronic flash device. Note that the zoom lens 102, stop 103, and focus lens 105 are driven by operations of mechanisms (not shown) upon rotation of the zoom lens motor 111, IG motor 113, and focus lens motor 115.

Note that in the video camera 100, the focus lens motor 114 and the focus lens motor 115 are so-called stepping motor respectively. The microcomputer 118 counts driving pulses of those stepping motors by counters (not shown) in the microcomputer 118. Therefore, the microcomputer 118 obtains current positions of the focus lens motor 114 and the focus lens motor 115 by reading the count value of the counters.

The output signal from the microcomputer 118 is also supplied to the AGC 107 to control its gain.

Furthermore, the electronic flash device 119 as a light projector for illuminating an object comprises a main light-emitting unit 120 and an auxiliary light light-emitting unit (auxiliary light-emitting unit) 121.

A series of AF control operations of the video camera 100 with the above-mentioned arrangement will be explained below.

The microcomputer 118 systematically controls the entire video camera including an auto-focus (AF) function. For example, the microcomputer 118 controls the focus lens 105 on the basis of the output signal from the AF evaluation value processing circuit 116, and controls the stop and AGC 107 on the basis of the output from the AE evaluation value processing circuit 117.

Light originating from an object (not shown) is imaged on the image sensing surface of the image sensing element 106 via the first lens group 101, the zoom lens 102 for zooming, the stop 103, the second lens group 104, and the focus lens 105 having both a function of compensating for movement of the focal plane upon zooming, and a focus adjustment function.

At this time, the microcomputer 118 supplies drive control signals to the zoom lens driver 111, IG driver 113, and focus lens driver 115. Hence, the zoom lens driver 111, IG driver 113, and focus lens driver 115 respectively drive the zoom lens motor 110, IG motor 112, and focus lens motor 115 in accordance with the drive control signals from the microcomputer 118. As a result, the zoom lens 102, stop 103, and focus lens 105 move.

The electronic flash device 119 emits light for increasing the illuminance (brightness) of an object (not shown). The main light-emitting unit 120 and auxiliary light-emitting unit 121 of the electronic flash device 119 are ON/OFF-controlled by the microcomputer 118.

The object (not shown) is irradiated with light emitted by lamps (not shown) arranged in the main light-emitting unit 120 or auxiliary light-emitting unit 121 under the control of the microcomputer 118.

The image sensing element 106 comprises, e.g., a CCD (Charge Coupled Device), converts light coming from the focus lens 105 into an electrical signal (photoelectric conversion), and supplies the electrical signal to the AGC 107.

The AGC 107 amplifies the electrical signal from the image sensing element 102 by a predetermined amplification factor, controls the gain of the amplified signal in accordance with the output signal from the microcomputer 118, and supplies the controlled signal as a video signal to the camera signal processing circuit 108, AF evaluation value processing circuit 116, and AE evaluation value processing circuit 117.

The camera signal processing circuit 108 performs predetermined processing for the video signal supplied from the AGC 107, and supplies the processed video signal to the recording device 109.

The recording device 109 records the video signal from the camera signal processing circuit 108 on, e.g., a magnetic tape as a storage medium.

On the other hand, the AF evaluation value processing circuit 116 generates an AF evaluation value signal by extracting a high-frequency component used in focus detection from the video signal output from the camera signal processing circuit 108, and supplies the generated signal to the microcomputer 118.

The AE evaluation value processing circuit 117 generates an AE evaluation value signal by extracting the integrated value of luminance values used in exposure control from the video signal output from the camera signal processing circuit 108, and supplies the generated signal to the microcomputer 118.

The microcomputer 118 controls the focus lens 105, stop 103, and AGC 107 on the basis of these output signals from the AF and AE evaluation value processing circuits 116 and 117.

The control by the microcomputer 118 will be described in detail below.

The microcomputer 118 has a ROM 118$a$ which pre-stores various processing programs for controlling operation of the entire video camera including the AF function, and these processing programs are read out and executed by the microcomputer 118.

Figure 2:
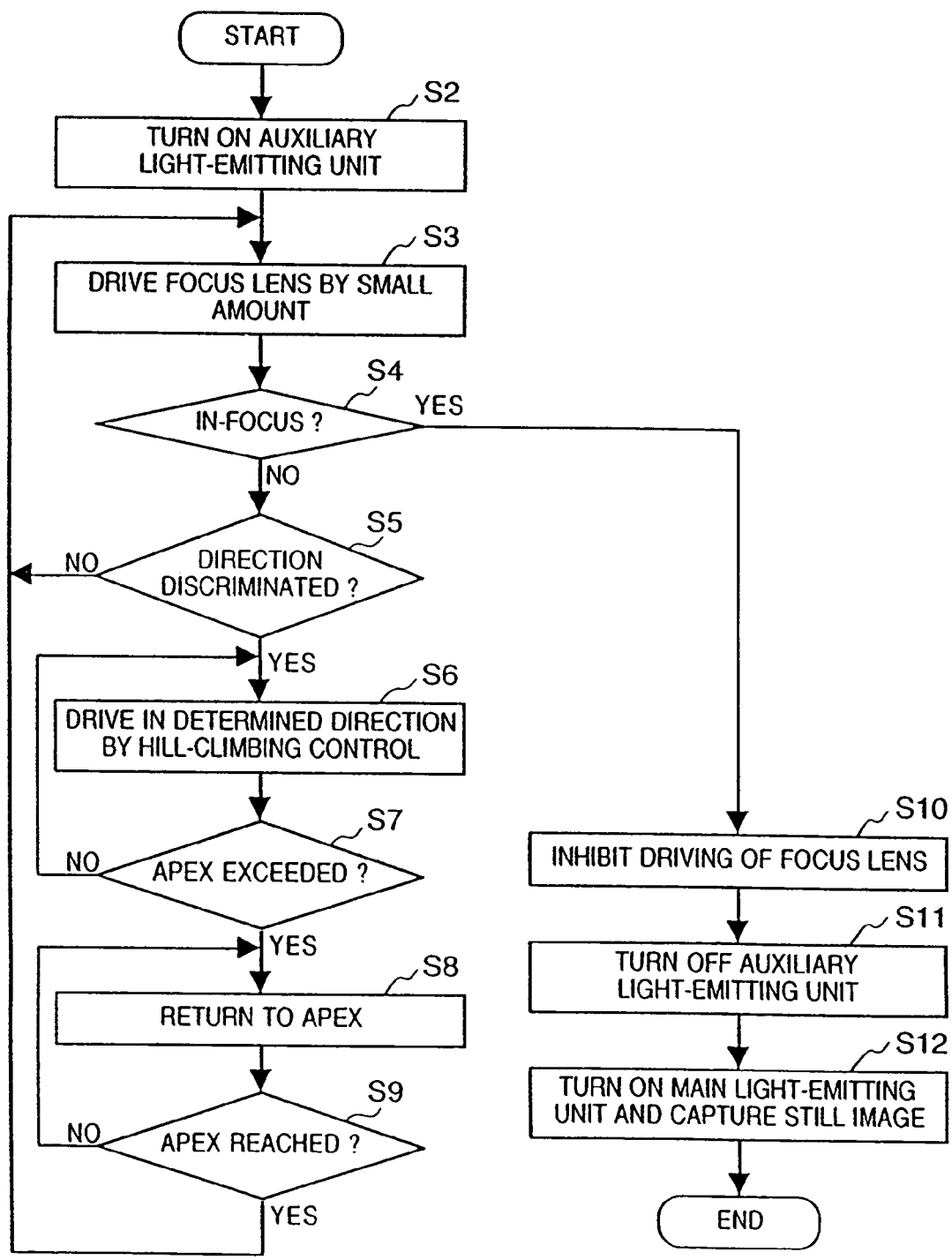
FIG. 2 is a flow chart showing AF control by the video camera according to the first embodiment of the present invention.

As the processing program for controlling the AF function, a processing program (AF processing program) according to the flow chart shown in, e.g., FIG. 2 is pre-stored in the ROM 118$a$, and the video camera 100 operates as follows when the AF processing program is read out and executed by the microcomputer 118.

Figure 12:
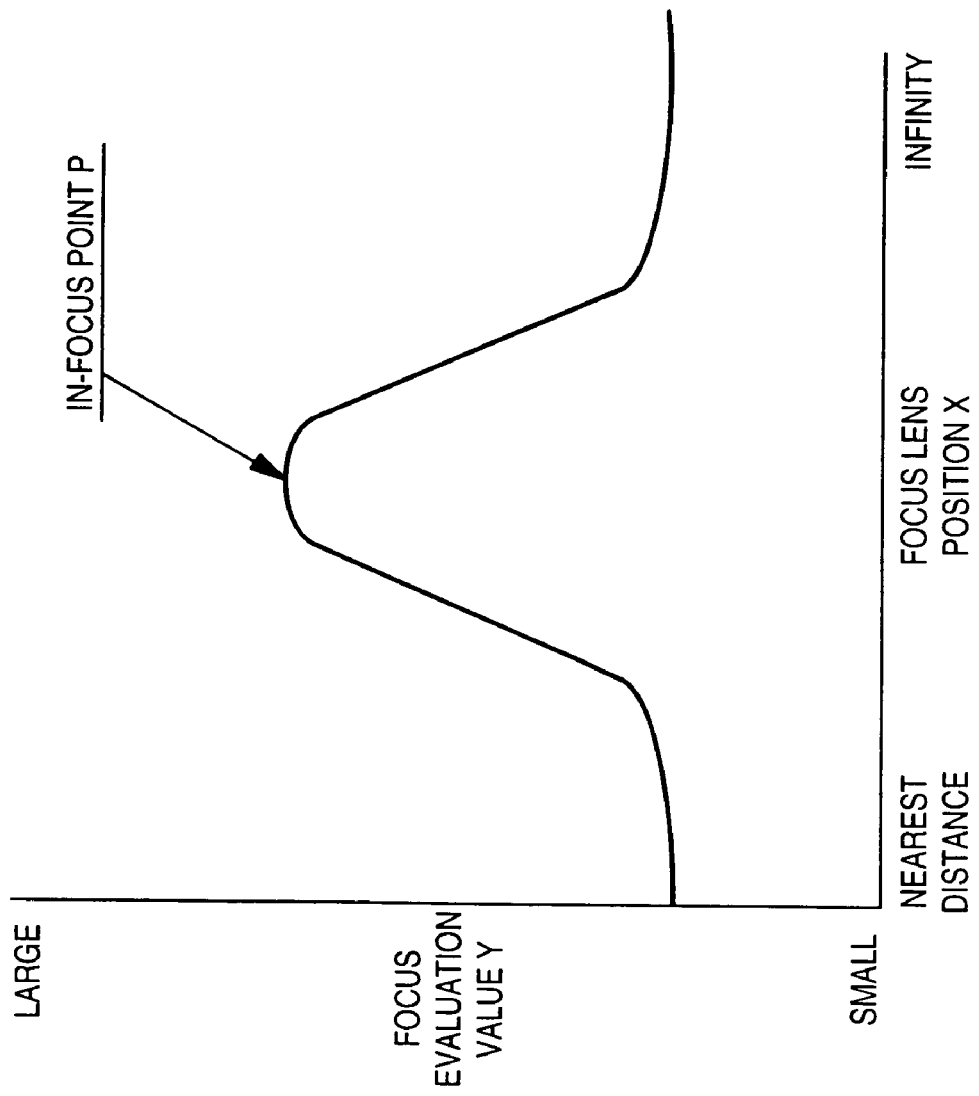
FIG. 12 is a graph showing the general characteristics of a focus evaluation value Y as a function of a position X of a focus lens.

Note that "hill-climbing control" based on the characteristic curve shown in FIG. 12, which has been described above with reference to FIG. 13, is also done in this embodiment.

The microcomputer 118 controls to turn on the auxiliary light-emitting unit 121. With this control, the auxiliary light-emitting unit 121 is turned on, and the emitted light is irradiated onto an object (not shown) (step S2).

The microcomputer 118 then supplies a control signal for micro-driving the focus lens 105 by a predetermined amount to the focus lens driver 115. With this control signal, the focus lens motor 114 is driven by the focus lens driver 115 to micro-drive the focus lens 105 by the predetermined amount (step S3).

The microcomputer 118 checks based on the AF evaluation value signal supplied from the AF evaluation value processing circuit 116 at that time if the focus lens 105 is currently located at an in-focus or out-of-focus position (step S4).

If it is determined in step S4 that the focus lens 105 is currently located at the in-focus position, the microcomputer 118 executes still image capturing control.

More specifically, the microcomputer 118 supplies a control signal for inhibiting driving of the focus lens 105 to the focus lens driver 115. With this signal, driving of the focus lens motor 114 by the focus lens driver 115 is inhibited, and the focus lens 105 is fixed in position (step S10).

The microcomputer 118 then controls the auxiliary light-emitting unit 121 of the electronic flash device 119 to turn off. With this control, auxiliary light-emitting unit 121 is turned off (step S11).

The microcomputer 118 controls to turn on the main light-emitting unit 120 of the electronic flash device 119, and captures a still image, thus ending this processing. With this control, the main light-emitting unit 120 is turned on, and a video signal as the output from the camera signal processing circuit 108 is recorded on a magnetic tape by the recording device 109 (step S12).

On the other hand, if it is determined in step S4 that the focus lens 105 is currently not located at the in-focus position, the microcomputer 118 discriminates the direction of the in-focus position of the focus lens on the basis of the AF evaluation value signal supplied from the AF evaluation value processing circuit 116 at that time (step S5).

If the direction can be discriminated in step S5, the microcomputer 118 executes hill-climbing control in steps S6 and S7 (to be described later). If the direction cannot be discriminated, the flow returns to step S3 to repeat the subsequent processing steps.

If the direction can be discriminated in step S5, the microcomputer 118 supplies a control signal for driving the focus lens 105 in the discriminated direction by the hill-climbing control to the focus lens driver 115. With this control signal, driving of the focus lens motor 114 is controlled by the focus lens driver 115, and the focus lens 105 is driven by the hill-climbing control in the discriminated direction of the in-focus position (step S6).

The microcomputer 118 then checks based on the AF evaluation value signal supplied from the AF evaluation value processing circuit 116 at that time if the focus lens 105 has overshot the in-focus point, i.e., the apex of the AF evaluation value (step S7).

If it is determined in step S7 that the focus lens 105 has not overshot the apex of the AF evaluation value yet, the flow returns to step S6, and the microcomputer 118 continues hill-climbing control.

On the other hand, if it is determined in step S7 that the focus lens 105 has overshot the apex of the AF evaluation value, the microcomputer 118 supplies a control signal for returning the focus lens 105 to the apex position to the focus lens driver 115. With this signal, the focus lens motor 114 is driven by the focus lens driver 115, and the focus lens 105 is returned to the apex position (step S8). More specifically, overshooting beyond the apex is discriminated by detecting the peak value of the focus evaluation value, and the driving direction is reversed when the focus evaluation value drops a predetermined level from the peak value, thus returning the focus lens to the in-focus point where the peak value is detected.

The microcomputer 118 checks based on the AF evaluation value signal supplied from the AF evaluation value processing circuit 116 at that time if the focus lens 105 has reached the apex position (step S9), and repeats the processing in step S8 until the lens reaches the apex position.

During operation for returning the position of the focus lens 105 to the apex in steps S8 and S9, the object (not shown) may change due to, e.g., panning or the like of the video camera 100. In such case, when the position of the focus lens 105 has reached the apex ("YES" in step S9), the flow returns to step S3 and the microcomputer 118 executes operation control from micro driving again so as to discriminate if the current position of the focus lens 105 is on a correct apex, i.e., the in-focus point.

As described above, in this embodiment, after the focus lens 105 has reached the in-focus position by the AF function, and its driving is inhibited, the auxiliary light-emitting unit 121 of the electronic flash device 119 is automatically turned off. With this control, the focus lens can be prevented from moving from the in-focus position by the AF function when the auxiliary light-emitting unit is turned off, unlike in the prior art. Hence, upon capturing a still image, a high-quality still image can be obtained without causing an out-of-focus state.

In the above-mentioned embodiment, after the focus lens 105 is inhibited from moving from the in-focus position, the auxiliary light-emitting unit 121 of the electronic flash device 119 is automatically turned off. However, the present invention is not limited to such specific arrangement. For example, while the AF function is in operation, the auxiliary light-emitting unit 121 of the electronic flash device 119 may be inhibited from being turned off.

To restate, according to this embodiment, since the auxiliary light-emitting unit 121 of the electronic flash device 119 is inhibited from being turned off during focus adjustment by the AF function, neither the object state nor the focus evaluation value change. Hence, the AF function can be prevented from restarting operation arising from changes in focus evaluation value due to changes in illuminance of the object owing to changes in light-emitting state of the electronic flash device 119, and high-performance automatic focus adjustment can be realized.

Second Embodiment

In the first embodiment mentioned above, after the focus lens 105 is inhibited from moving from the in-focus position, the auxiliary light-emitting unit 121 of the electronic flash device 119 is turned off, thus recording a high-quality still image.

However, in the AF function implemented by the flow chart shown in FIG. 2, after focus adjustment is done by illuminating the object with light emitted by the auxiliary light-emitting unit 121, the focus lens may shift from the adjusted in-focus position upon capturing a still image by illuminating the object with light emitted by the main light-emitting unit 120.

Figure 3:
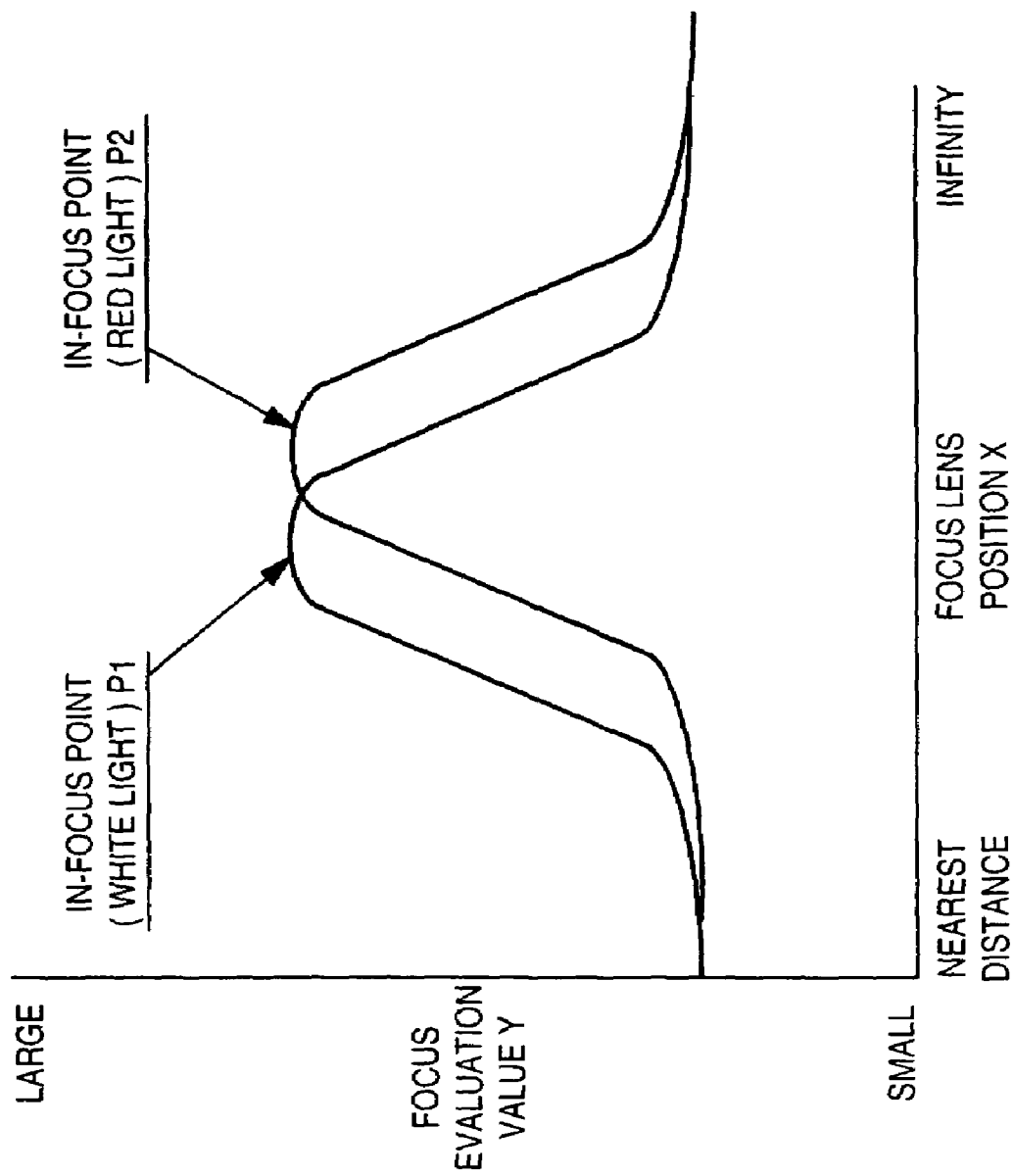
FIG. 3 is a graph showing the characteristics of focus evaluation values Y of white light (P1) and red light (P2) with respect to a position X of a focus lens.

More specifically, the lamp of the auxiliary light-emitting unit normally emits red light, and that of the main light-emitting unit emits white light. An in-focus position P2 adjusted using the red light is different from an in-focus position P1 adjusted using the white light, as shown in FIG. 3, and the in-focus position P1 adjusted using the white light is offset from the in-focus position P2 adjusted using the red light toward the nearest distance side.

Hence, the in-focus position obtained upon focus adjustment by illuminating the object with light emitted by the auxiliary light-emitting unit is different from that obtained when the object is illuminated with light emitted by the main light-emitting unit. This deteriorates the quality of the captured still image.

This embodiment solves such problem, and realizes an automatic focus adjustment device with higher precision.

In the second embodiment, the difference from the first embodiment described above lies in that the in-focus positions obtained using color light beams emitted by the two light-emitting units differ depending on their wavelengths, since the auxiliary light-emitting unit 121 emits red light, and the main light-emitting unit 120 emits white light, as described above with reference to FIG. 3. That is, the in-focus position P1 obtained when the main light-emitting unit 120 is ON is offset from the in-focus position P2 obtained when the auxiliary light-emitting unit 121 is ON toward the nearest distance side. For this reason, the AF control done by the microcomputer 118 is only partially different from that in the first embodiment. Hence, a repetitive description thereof will be omitted, and only the difference will be mainly explained.

Figure 4:
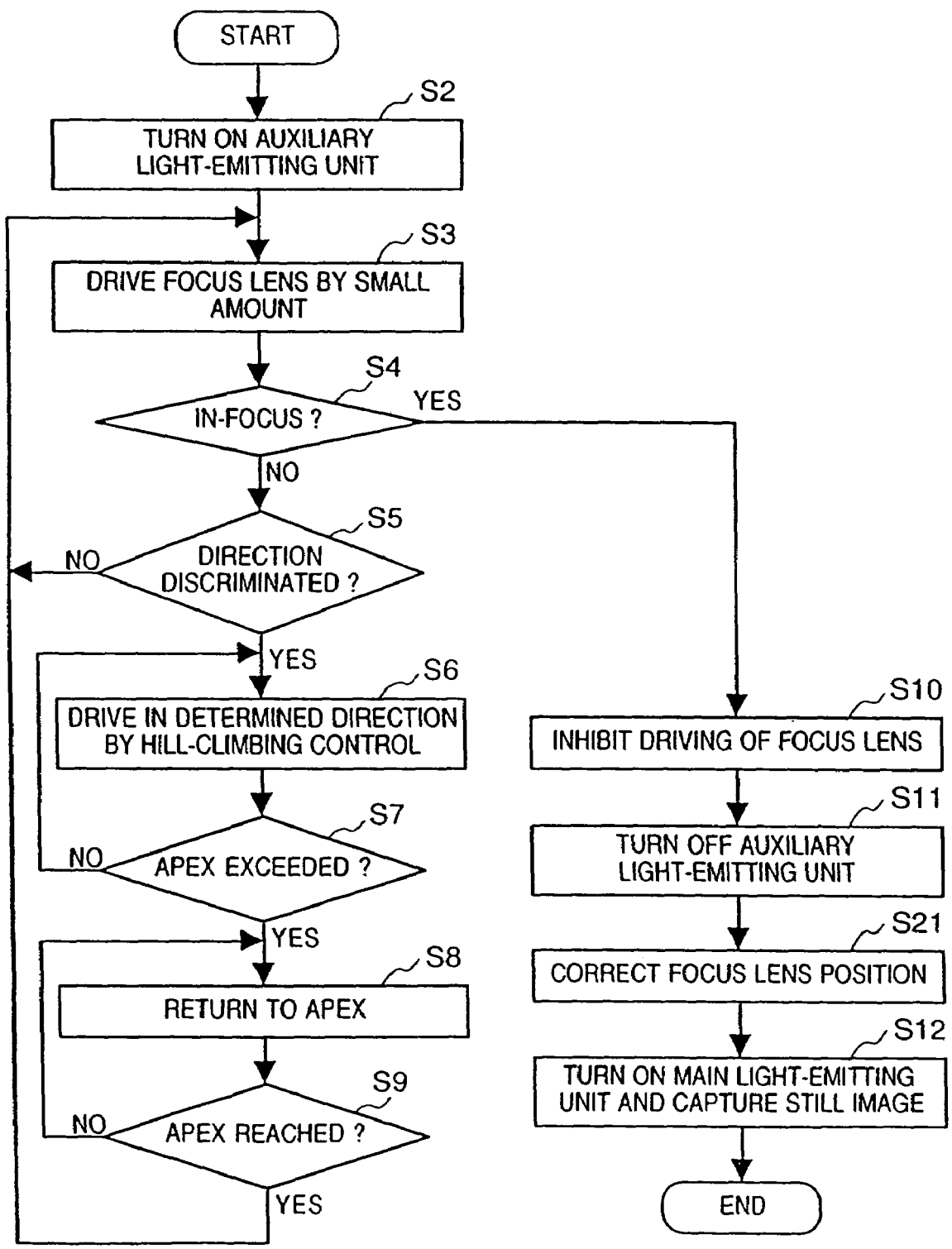
FIG. 4 is a flow chart showing AF control by the video camera according to the second embodiment of the present invention.

FIG. 4 is a flow chart showing the AF control of an image sensing apparatus according to the second embodiment of the present invention. The difference from FIG. 2 is that the auxiliary light-emitting unit 121 is turned off in step S11, and after that, the position of the focus lens 105 is corrected in step S21.

The microcomputer 118 sends a control signal for moving the position of the focus lens 105 by a predetermined amount in the infinity direction to the focus lens driver 115 in step S21. Note that the predetermined amount can be extracted based on the difference between the wavelengths of light beams, and may be calculated as needed or may be pre-stored in, e.g., a ROM.

With this signal, the focus lens motor 114 is driven by the focus lens driver 115, and the focus lens 105 moves by the predetermined amount toward the infinity side. As a consequence, the position of the focus lens can be corrected to the in-focus position P2 obtained when the main light-emitting unit 120 is ON.

In this embodiment, as shown in FIG. 4, after the driving of the focus lens 105 is inhibited at the in-focus position, the auxiliary light-emitting unit 121 of the electronic flash device 119 is automatically turned off, and the offset between the in-focus position (P2) obtained when the auxiliary light-emitting unit 121 is ON upon focus adjustment, and the in-focus position (P1) obtained when the main light-emitting unit 120 is ON upon capturing a still image is corrected, i.e., the offset between the in-focus positions arising from different illumination light beams used in focus adjustment and still image capturing is corrected. With this arrangement, even when the main light-emitting unit 120 is turned on after the auxiliary light-emitting unit 121 is turned off like in the first embodiment, the focus lens 105 can be prevented from moving from the in-focus position, thus always attaining accurate focus adjustment.

Third Embodiment

The third embodiment will be described below.

In the second embodiment described above, any offset of the in-focus position resulting from different illumination light beams used in focus adjustment and still image capturing is corrected.

However, this offset amount equals the theoretically calculated value itself if the image of an object which is illuminated only by the electronic flash device 119 (main light-emitting unit 120 and auxiliary light-emitting unit 121) is to be sensed, but it does not equal the theoretically calculated value itself if the image of an object illuminated by another illumination source other than the electronic flash device is to be sensed, since the wavelength component of light originating from that illumination source influences.

In such case, if the in-focus position is corrected using the theoretically calculated offset amount, the focus lens may not reach an in-focus position.

In this embodiment, even when the object is illuminated by another illumination source, optimal AF control can be done to obtain an accurate in-focus position.

Figure 5:
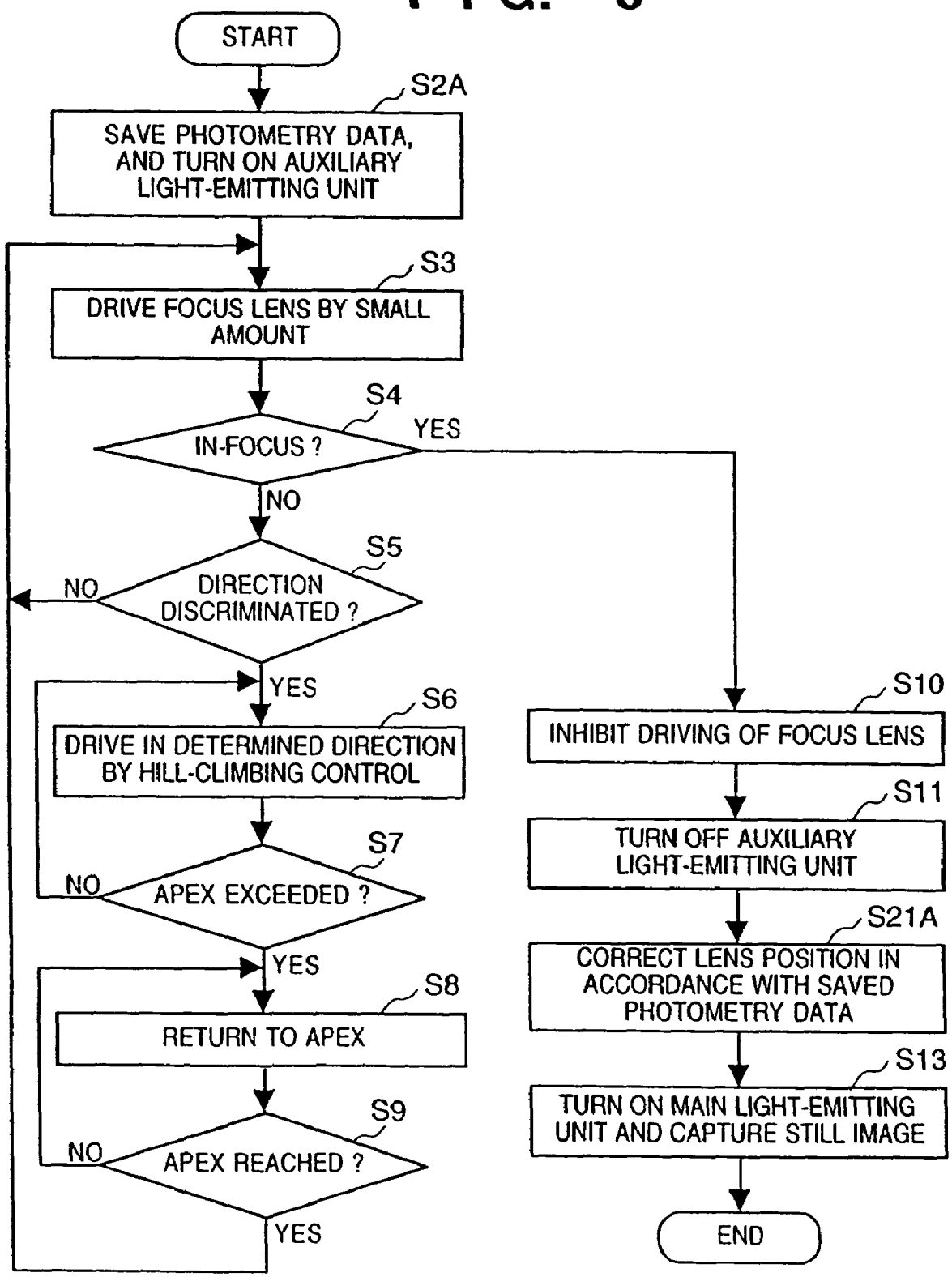
FIG. 5 is a flow chart showing AF control by the video camera according to the third embodiment of the present invention.

For this purpose, in the AF processing program shown in FIG. 4, the processing in steps S2 and S21 is replaced by that in, e.g., steps S2A and S21A shown in FIG. 5.

In the flow chart shown in FIG. 5, the same step numbers denote the same processing steps as in the flow chart shown in FIG. 2, and a detailed description thereof will be omitted. Hence, only different processing steps will be explained in detail below.

More specifically, the microcomputer 118 saves measurement data indicating the current illuminance of the object, and controls to turn off the auxiliary light-emitting unit 121 in step S2A.

After that, the microcomputer 118 controls to micro-drive the focus lens 105 (step S3), and checks if the focus lens 105 is currently located at the in-focus position (step S4). If it is determined that the focus lens 105 is currently located at the in-focus position, the microcomputer 118 executes the processing in step S10 and subsequent steps.

In the processing in step S10 and subsequent steps, the microcomputer 118 inhibits driving of the focus lens 105 (step S10), and then turns off the auxiliary light-emitting unit 121 of the electronic flash device 119 (step S11). The microcomputer 118 controls to correct any offset of the in-focus position (step S21A).

In the microcomputer 118, for example, correspondence table data between the illuminance (Lux) of the object and correction amount (mm) shown in FIG. 6 are stored in advance in the ROM 118a.

In step S21A, the microcomputer 118 acquires the correction amount corresponding to the measurement data (current illuminance of the object) saved in step S2A above from the table data shown in FIG. 6, and supplies the acquired correction amount to the focus lens driver 115 as a control signal. With this control signal, the focus lens motor 114 is driven by the focus lens driver 115, and the focus lens 105 moves by the correction amount in the infinity direction.

The microcomputer 118 controls to turn on the main light-emitting unit 120 of the electronic flash device 119, and to capture a still image (step S12), thus ending this processing.

To recapitulate, according to this embodiment, upon correcting the offset of the in-focus position resulting from different illumination light beams used upon focus adjustment and upon still image capturing, a correction amount corresponding to the illuminance of the object is used. Hence, accurate focus adjustment can be done irrespective of the illuminance state of the object (e.g., when the image of an object illuminated by another illumination source other than the electronic flash device 119 (main light-emitting unit 120 and auxiliary light-emitting unit 121) is to be sensed).

Fourth Embodiment

The fourth embodiment will be described below.

In the second embodiment described above, the offset of the in-focus position resulting from different illumination light beams used in focus adjustment and still image capturing is corrected.

Figure 7:
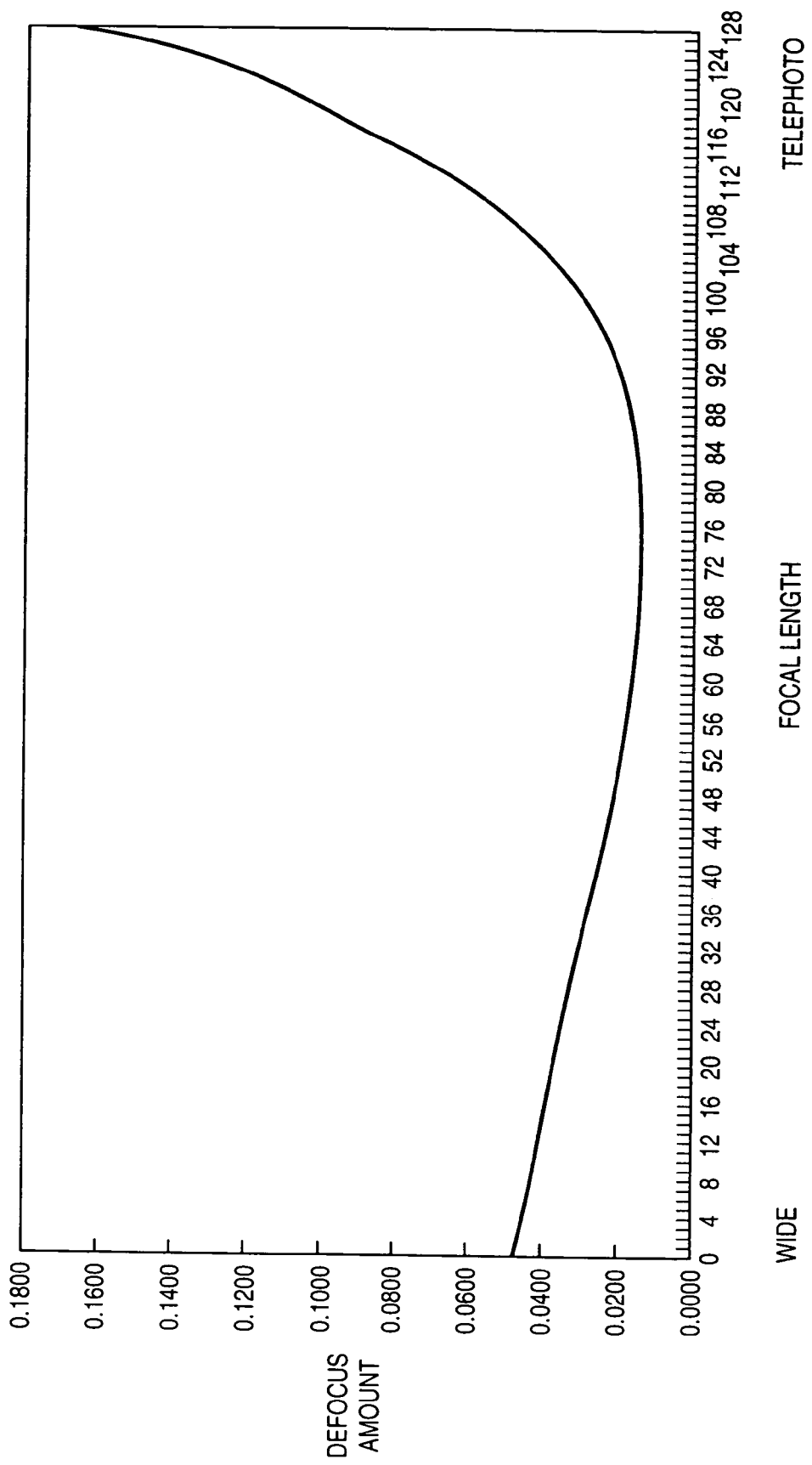
FIG. 7 is a graph showing the defocus amount of a focus lens from its in-focus position as a function of the focal length of a zoom lens in AF control according to the fourth embodiment of the present invention.

However, since the offset amount varies depending on the optical characteristics of the video camera 100, it varies depending on the focal length upon movement of the zoom lens 102, as shown in FIG. 7. For this reason, when the offset of the in-focus position is uniformly corrected, the focus lens may not often reach the in-focus position in accordance with the moving state of the zoom lens 102.

In this embodiment, an accurate in-focus position can be set even when the focal length with respect to the image sensing element 106 changes upon movement of the zoom lens 102.

Figure 8:
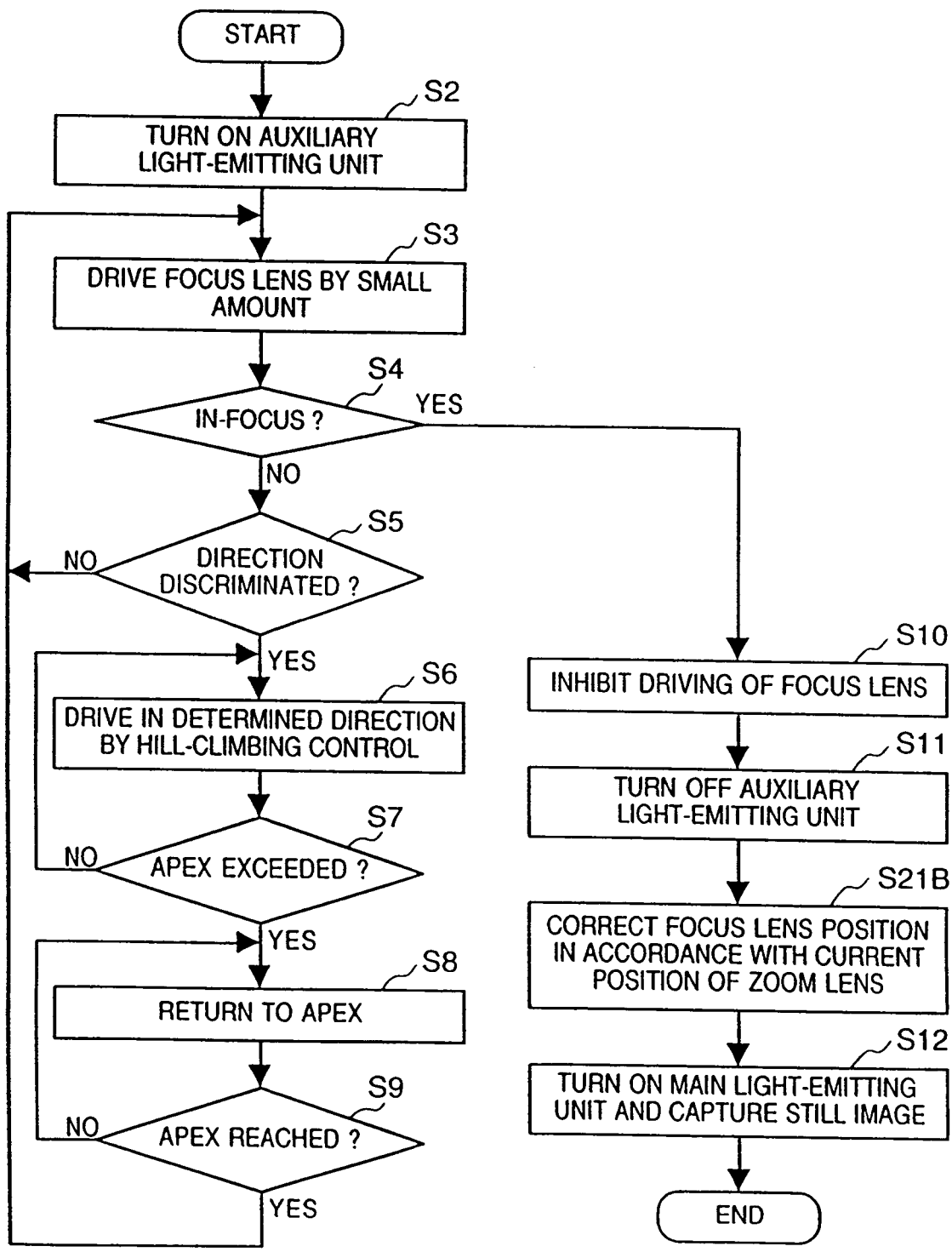
FIG. 8 is a flow chart showing AF control by the video camera according to the fourth embodiment of the present invention.

For this purpose, in the AF processing program shown in FIG. 4, the processing in step S21 is replaced by that in step S21B shown in, e.g., FIG. 8.

In the flow chart shown in FIG. 8, the same step numbers denote the same processing steps as in the flow chart shown in FIG. 4, and a detailed description thereof will be omitted. Hence, only different processing steps will be explained in detail below.

More specifically, the microcomputer 118 controls to turn off the auxiliary light-emitting unit 121 (step S2), controls to micro-drive the focus lens 105 by a predetermined amount (step S3), and checks if the focus lens 105 is currently located at an in-focus position (step S4). If it is determined that the focus lens 105 is currently located at the in-focus position, the microcomputer 118 executes the processing in step S10 and subsequent steps.

In the processing in step S10 and subsequent steps, the microcomputer 118 inhibits driving of the focus lens 105 (step S10), and then turns off the auxiliary light-emitting unit 121 of the electronic flash device 119 (step S11). The microcomputer 118 controls to correct any offset of the in-focus position (step S21B).

In the microcomputer 118, for example, offset amount information of the in-focus position corresponding to the focal length upon movement of the zoom lens 102 shown in FIG. 7 is pre-stored in the ROM 118a.

In the step S21B, the microcomputer 118 acquires the offset amount (correction amount) corresponding to the focal length at the current position of the zoom lens 102 using this information, and supplies the acquired correction amount to the focus lens driver 115 as a control signal.

With this control signal, the focus lens motor 114 is driven by the focus lens driver 115, and the focus lens 105 moves by the correction amount.

Note that in the step S21B, the microcomputer 118 obtains the current position of the zoom lens 102 from the counter.

The microcomputer 118 controls to turn on the main light-emitting unit 120 of the electronic flash device 119, and to capture a still image (step S12), thus ending this processing.

As described above, in this embodiment, upon correcting the offset of the in-focus position resulting from different illumination light beams used upon focus adjustment and upon still image capturing, the correction amount corresponding to the focal length upon movement of the zoom lens 102 is used. Hence, even when the position of the zoom lens 102 has changed, accurate focus adjustment can be done.

Fifth Embodiment

In the aforementioned embodiments, upon executing focus adjustment by illuminating an object with light emitted by the auxiliary light-emitting unit 121, since the auxiliary light-emitting unit 121 cannot be kept ON over the entire focus adjustment period owing to the durability of the auxiliary light-emitting unit 121 and consumption power, the auxiliary light-emitting unit is turned on and off.

However, since the AF evaluation value varies between the ON and OFF states of the auxiliary light-emitting unit, accurate AF control cannot be done if auxiliary light is turned on/off at disordered timings.

Hence, this embodiment solves such problem, and has as its objective to satisfactorily protect the auxiliary light-emitting unit and to attain accurate AF control.

In this embodiment, the difference from the above-mentioned first embodiment lies in ON operation of the auxiliary light-emitting unit (S2B) and the AF (focus) evaluation value calculation (S31) in the AF processing done by the microcomputer. Hence, a repetitive description will be avoided, and only the difference will be mainly explained.

Figure 10:
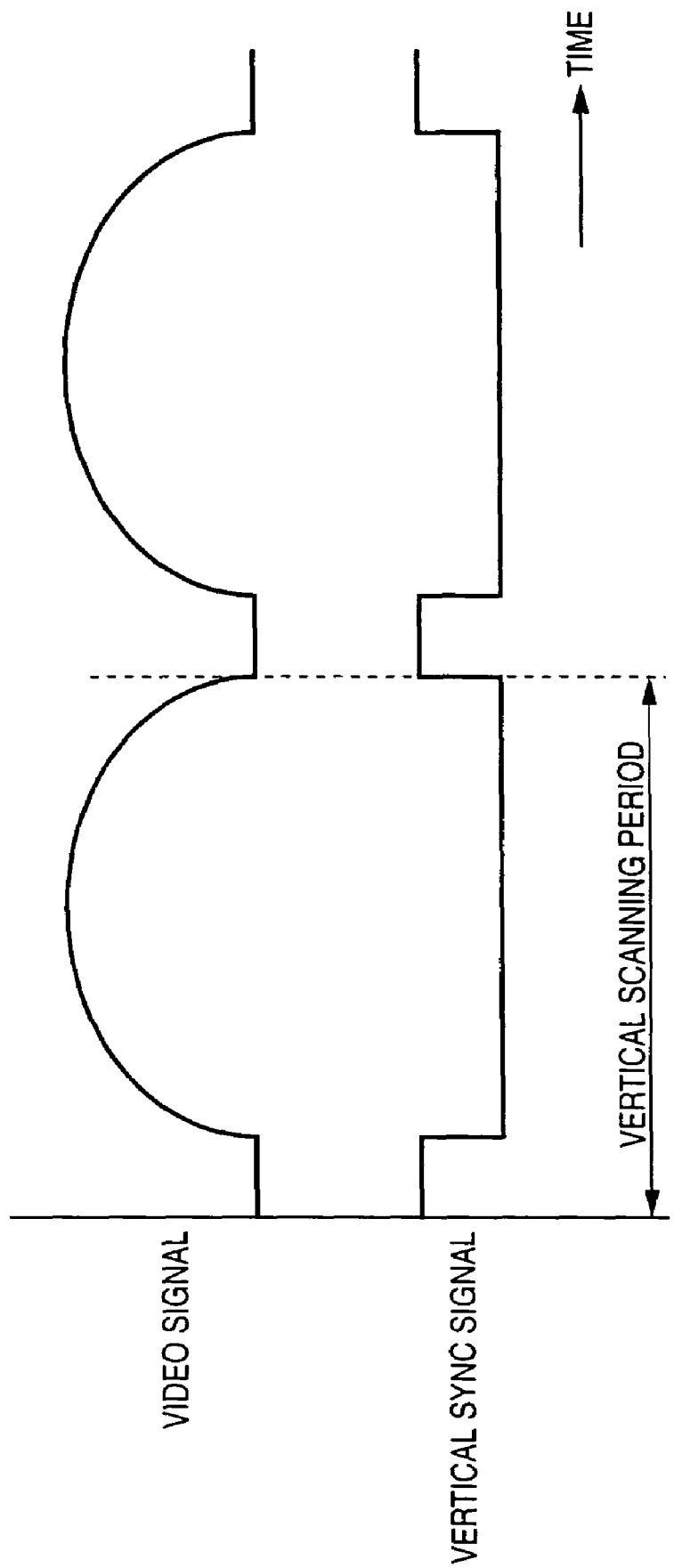
FIG. 10 is a timing chart showing the relationship among the video signal and vertical scanning period according to the fifth embodiment of the present invention.

In this embodiment, the focus (AF) evaluation value processing circuit 116 and exposure (AE) evaluation value processing circuit 117 obtain a peak differential value and integrated value from a video signal for one vertical scanning period, as shown in FIG. 10, and use them as their focus and exposure evaluation values.

Figure 9:
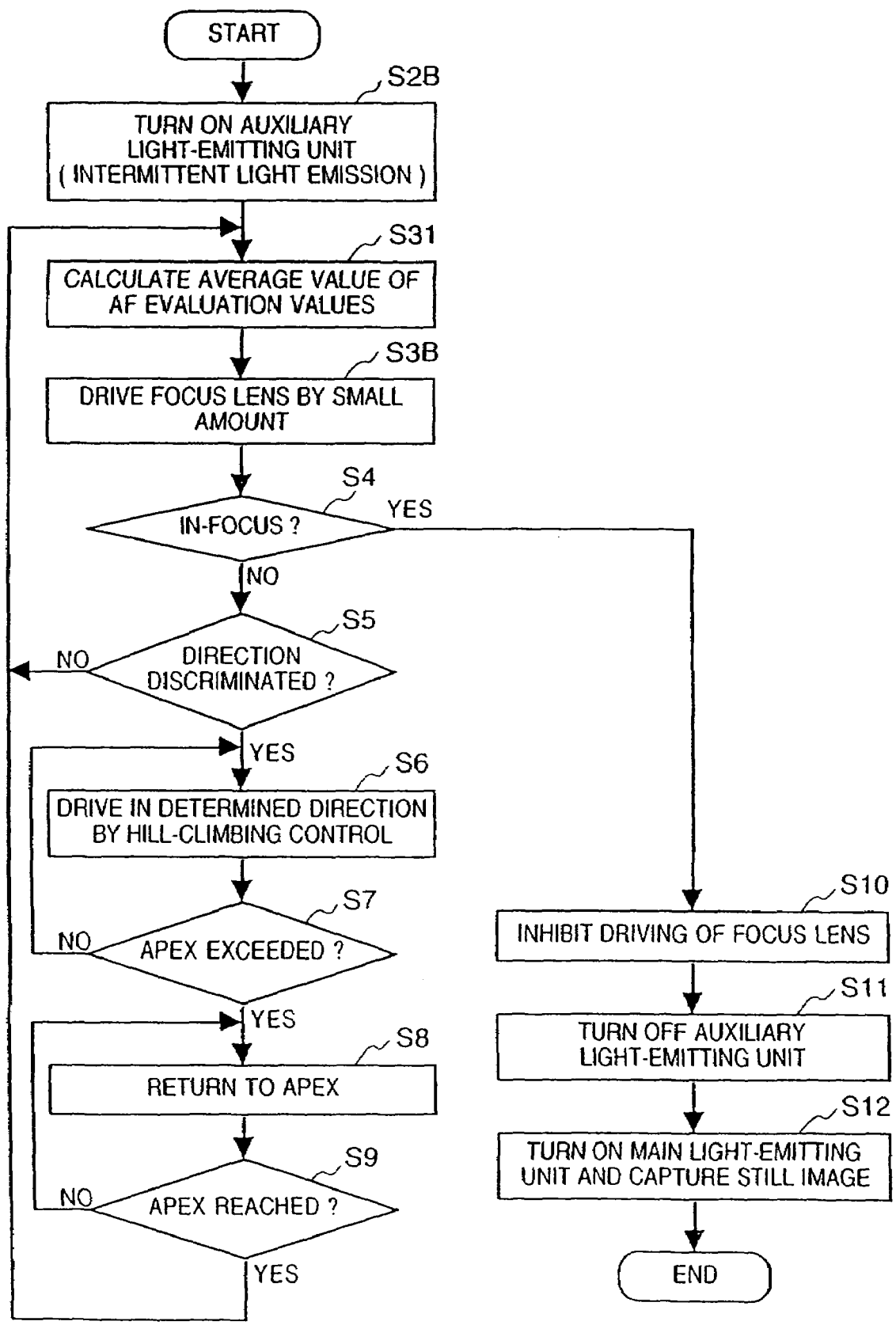
FIG. 9 is a flow chart showing AF control by the video camera according to the fifth embodiment of the present invention.

In an image sensing apparatus of this embodiment, the method of turning on auxiliary light upon flickering the auxiliary light in step S2B and the calculation of the average value of AF evaluation values in step S31 in the flow chart shown in FIG. 9 are different from those in FIG. 2.

Figure 11:
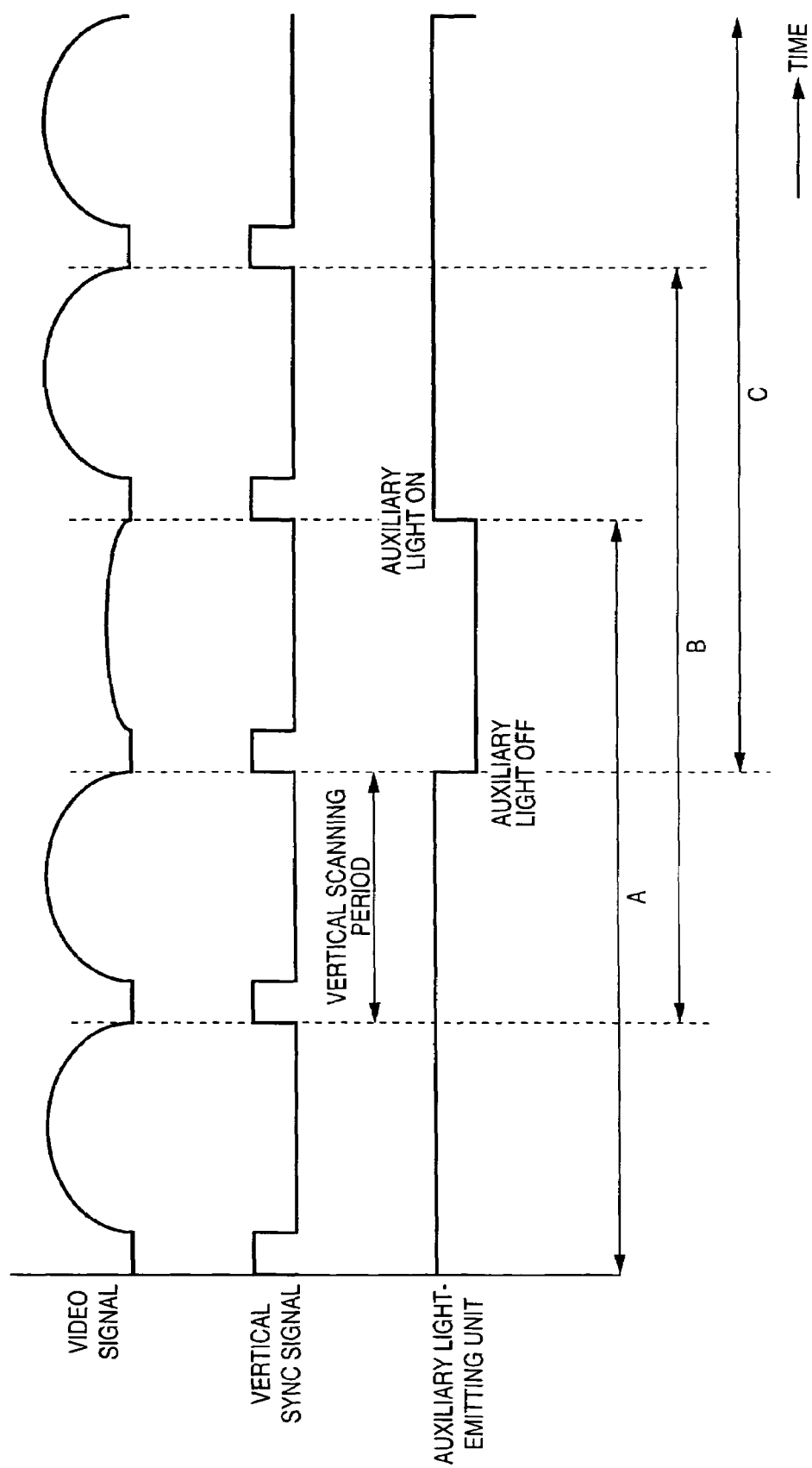
FIG. 11 is a timing chart showing the relationship among the video signal, vertical scanning period, and ON state of an auxiliary light-emitting unit in the video camera according to the fifth embodiment of the present invention.

More specifically, in step S2B, the auxiliary light-emitting unit 121 of this embodiment is turned on/off at timings synchronous with the vertical sync signals of a video signal, and its ON time is set at an integer multiple of the vertical scanning period upon emitting light, as shown in FIG. 11. With this control, when the auxiliary light-emitting unit 121 is controlled to intermittently emit light to improve its durability, emission efficiency drop can be minimized, and effective light emission can be done during all the vertical scanning periods of a video signal.

However, the auxiliary light-emitting unit 121 intermittently emits light in synchronism with the vertical scanning periods of a video signal, and is turned on for two vertical scanning periods and is turned off for one vertical scanning period. For this reason, the illuminance becomes short once per three vertical scanning periods. If an evaluation value obtained during the OFF period of the unit 121 is not used in the AF processing, AF control is disabled in that vertical scanning period. Consequently, the control is limited, and the control processing to be executed by the microcomputer 118 is complicated. To solve such problem, in this embodiment, the average value of the AF evaluation values for three vertical scanning periods is calculated in step S31, and is used as the AF evaluation value to execute AF control during all the vertical scanning periods.

With this control, since the AF evaluation values when the auxiliary light is ON can be obtained during two vertical scanning periods in all of intervals (A), (B), and (C) in FIG. 11, AF control can be done reliably. In this fashion, since the auxiliary light is intermittently emitted, the durability of the auxiliary light-emitting unit 121 can be maintained. Also, since the average value of the AF evaluation values during three vertical scanning periods is used, accurate focus adjustment can be realized, and optimal AF control can be attained.

To restate, according to this embodiment, since the auxiliary light-emitting unit 121 is turned on/off at timings synchronous with the vertical sync signals of a video signal, and its ON time is set at an integer multiple of the vertical scanning period upon emitting auxiliary light, all the emission periods can be effectively used in intermittent emission, which is done for improving the durability of the auxiliary light-emitting unit. Therefore, the durability of the auxiliary light-emitting unit can be improved, and the emission efficiency can also be greatly improved. Also, the consumption power can be reduced.

Since the auxiliary light-emitting unit intermittently emits light, the durability of the auxiliary light-emitting unit can be improved. Also, since the average value of the AF evaluation values during three vertical scanning periods is used, accurate focus adjustment can be realized, and optimal AF control can be attained.

Note that the fifth embodiment has been described on the basis of the flow chart of FIG. 2 in the first embodiment for the sake of simplicity. However, the present invention is limited to such specific control, and the fifth embodiment may be built in the AF control described in the second to fourth embodiments.

To recapitulate, according to the aforementioned embodiments, an automatic focus adjustment device which inhibits focus adjustment resulting from changes in ON state of the light projector and can attain optimal automatic focus adjustment, a focus adjustment method, and an image sensing apparatus can be provided.

Another Embodiment

Note that the objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
a light projector for illuminating an object;
an optical system for receiving an image of the object illuminated by said light projector;
image sensing means for sensing an object image obtained via said optical system, and outputting the input video signal;
focus adjustment control means for adjusting a position of said optical system to an in-focus position by moving said optical system in an optical axis direction on the basis of a specific component in the video signal output from said image sensing means; and
recording means for recording a moving or still image of an object on a recording medium in correspondence with the video signal,
wherein said focus adjustment control means turns on/off said light projector in synchronism with a vertical sync signal of the video signal and sets an ON period of said light projector at an integer multiple of a vertical sync period of the video signal upon executing focus adjustment with respect to the object.

2. The apparatus according to claim 1, wherein said focus adjustment control means turns on/off said light projector in synchronism with the vertical sync signal of the video signal, sets an ON period of said light projector twice the vertical sync period of the video signal, and sets an OFF period of said light projector to be equal to the vertical sync period of the video signal, upon executing focus adjustment with respect to the object.

3. The apparatus according to claim 2, wherein said focus adjustment control means adjusts the position of said optical system to the in-focus position in accordance with an average value of focus evaluation values obtained during a period three times the vertical sync period.

4. The apparatus according to claim 1, wherein upon completion of focus adjustment for the object while said light projector is ON, said focus adjustment control means inhibits said optical system from being driven before said light projector is turned off.

5. A focus adjustment method for an image sensing apparatus which illuminates an object by a light projector, senses an image of the illuminated object input via an optical system using an image sensing element, and records a moving or still image of the object on a recording medium in correspondence with a video signal output from said image sensing element,
wherein a focus adjustment control step of adjusting a position of said optical system to an in-focus position with respect to the object includes the step of turning on/off said light projector in synchronism with a vertical sync signal of the video signal when said optical system is moved in an optical axis direction to maximize a focus evaluation value obtained by extracting a high-frequency component from the video signal output from said image sensing element, and setting an ON period of said light projector at an integer multiple of a vertical sync period of the video signal.

6. The method according to claim 5, wherein the focus adjustment control step includes the step of turning on/off said light projector in synchronism with the vertical sync signal of the video signal, setting an ON period of said light projector twice the vertical sync period of the video signal, and setting an OFF period of said light projector to be equal to the vertical sync period of the video signal.

7. The method according to claim 6, wherein the focus adjustment control step includes the step of adjusting the position of said optical system to the in-focus position in accordance with an average value of focus evaluation values obtained during a period three times the vertical sync period.

8. The method according to claim 5, wherein upon completion of focus adjustment for the object while said light projector is ON, the focus adjustment control step includes the step of inhibiting said optical system from being driven before said light projector is turned off.

9. A computer-readable storage medium which stores a program code of automatic focus adjustment in an image sensing apparatus which illuminates an object by a light projector, senses an image of the illuminated object input via an optical system using an image sensing element, and records a moving or still image of the object on a recording medium in correspondence with a video signal output from said image sensing element, wherein a code of the focus adjustment step of adjusting a position of said optical system to an in-focus position with respect to the object turns on/off said light projector in synchronism with a vertical sync signal of the video signal when said optical system is moved in an optical axis direction to maximize a focus evaluation value obtained by extracting a high-frequency component from the video signal output from said image sensing element, and sets an ON period of said light projector at an integer multiple of a vertical sync period of the video signal.

* * * * *